United States Patent Office.

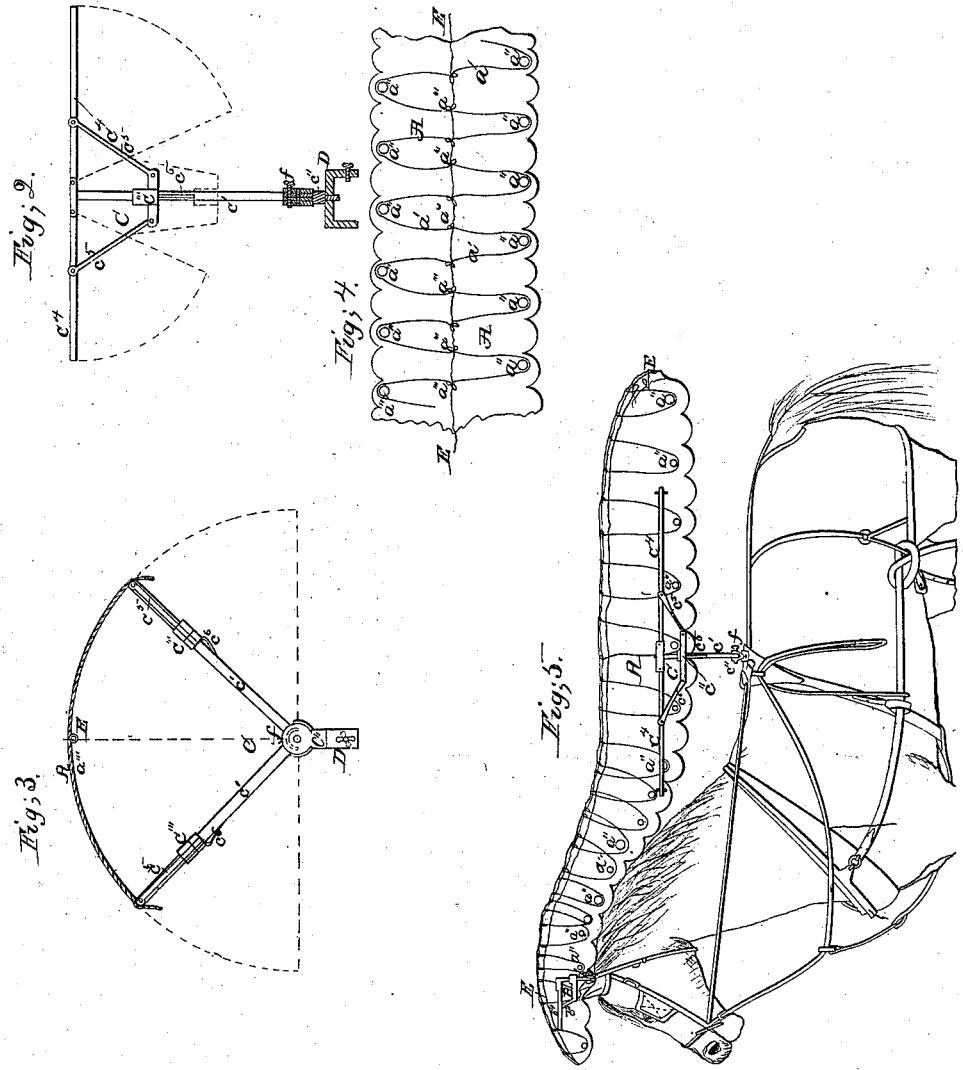

SARAH RUTH, OF PHILADELPHIA, PENNSYLVANIA.

Letters Patent No. 81,412, dated August 25, 1868.

IMPROVEMENT IN SUN-SHADE FOR HORSES.

The Schedule referred to in these Letters Patent and making part of the same.

TO ALL WHOM IT MAY CONCERN:

Be it known that I, SARAH RUTH, of the city of Philadelphia, in the State of Pennsylvania, have invented a new and useful Improvement in the Sun-Shade for Horses and other draught-animals in harness; and I do hereby declare that the following is a full, clear, and exact description of the construction and operation of the same, reference being had to the accompanying drawings, making a part of this specification, in which—

Figure 1 represents a section of the supporting-frame of the forward or head-end of the canopy thereof.

Figure 2, a section of the supporting-frame of the main portion of the canopy.

Figure 3, a front view of the entire supporting-frame of the main portion of the canopy, with the latter applied thereto.

Figure 4, a sectional plan view of the under side of the canopy, and

Figure 5 a central longitudinal section of the entire shade as applied over the animal—

Like letters of reference indicating the same parts when in the different figures.

The object of my improvement is to afford better protection to horses, mules, and other draught-animals attached to drays, carts, &c., from either the vertical or oblique rays of the sun in hot weather, without preventing a free and open circulation of air between the said protector and the animal.

My invention consists of a canopy and articulated adjustable supporting-frames, constructed, applied, and operated substantially in the manner hereinafter set forth and specified.

Referring to the drawings, A is the canopy, and B and C its supporting-frames.

The canopy, A, consists of coarse bleached linen or cotton fabric, or any other suitable material, of sufficient length and breadth to shade the whole animal when applied, and has fixed to its under side a steel wire, $a'$, which extends from the head-end in a zigzag manner from side to side thereof, to the rear end of the same, the turns $a''$ in the zigzagged wire being bent into one or two coils, so as to allow a more free and easy contraction and expansion of the canopy, as the movement of the animal's head up and down and the length of his back and neck may require, (see figs. 4 and 5,) and also one or two coils being made in the middle of the several crossing parts of the said wire, to give increased spring to the latter, and thus facilitate in producing and varying the curved form required in the canopy A from side to side, (see fig. 3.)

An elastic cord, E, is fixed to the head-end of the canopy, and, passing through the coils $a'''$ to the rear end, enables the driver to contract the canopy A to suit the animal, and, when tied, to retain the adjustment, and at the same time to allow the animal to move his head up and down without displacing thereby the said canopy or its supporting-frames B C.

The supporting-frames B and C, each consist of two arms, $b'$ $b'$ and $c'$ $c'$, jointed to the respective stems $b''$ $c''$, whereby they are adjustably supported in respective blocks D D, permanently attached to any suitable part of the harness. The joints just specified allow the said arms $b'$ and $c'$ to be adjusted near together at their upper ends, or further apart, to suit the width of the canopy A, and also to be turned over together, either to the right or to the left, to protect the animal from the oblique rays of the sun, (see the dotted lines in fig. 3.)

The said arms are held firmly in the different positions mentioned, by means of a clamping-screw, $f$, in the stem-piece $c''$, which, passing through curved slots (see fig. 3) in the adjoining arms $c'$ $c'$, and compressing the two together when the nut is screwed up tightly.

Each of the arms of the frame C is provided with a slide, $c'''$, which is connected to two transverse arms, $c^4$ $c^4$, (that are jointed to the upper end of the main arm $c'$,) by means of two diagonally-arranged pieces, $c^5$ $c^5$, which are jointed to the slide $c'''$ and to the arms $c^4$ $c^4$, so that the said arms $c^4$ can be readily raised up to an aligned or horizontal position, or be as readily brought down toward the main arm $c'$, as indicated by the dotted lines in fig. 2, the said aligned position being retained by means of a snap-spring, $c^6$, in the arm $c'$, which acts like an umbrella-spring under the said slide.

The supporting-frame B is constructed and operates precisely like the frame C, except that it has but one horizontal arm $b^4$, the elastic cord E being sufficient to support the neck-portion of the canopy A.

The canopy A is attached to the frames B and C by means of buttons or hooks and eyes.

Both of the frames B and C are intended to be made of metal.

The application of this protection to the animal will be fully understood by reference to fig. 5, and its mode of adjustment and operation, by what has been already stated, and by reference to the drawings. It may be properly added, however, that the whole protection is light in weight, inexpensive in construction, easily applied and adjusted, effectually protects the animal from the sun, without preventing a free circulation of air between him and the canopy, and can at any time be readily removed and rolled up into a small package without injuring any of its parts.

Having thus fully described my improved sun-shade for draught-animals in harness, what I claim as new therein of my invention, and desire to secure by Letters Patent, is confined to the following, viz:

I claim the canopy A, and the supporting-frames B and C, the said parts being constructed, applied, and operated substantially as and for the purpose set forth and described.

SARAH RUTH.

Witnesses:
 BENJ. MORISON,
 WM. H. MORISON.